United States Patent [19]

Böhm

[11] Patent Number: 4,521,071
[45] Date of Patent: Jun. 4, 1985

[54] GRADED INDEX ROD LENS COMPRISING LIGHT-WAVE CONDUCTORS

[75] Inventor: Heinz Böhm, Erlangen, Fed. Rep. of Germany

[73] Assignee: U.S. Philips Corporation, New York, N.Y.

[21] Appl. No.: 492,106

[22] Filed: May 6, 1983

[30] Foreign Application Priority Data

May 13, 1982 [DE] Fed. Rep. of Germany ....... 3217984

[51] Int. Cl.³ .............................................. G02B 5/172
[52] U.S. Cl. ................................................. 350/96.18
[58] Field of Search ............... 350/96.15, 96.16, 96.18, 350/96.20, 413

[56] References Cited

U.S. PATENT DOCUMENTS 4,213,677  7/1980  Sugimoto et al. ............... 350/96.18
4,245,884  1/1981  Magura et al. ................... 350/96.16
4,290,667  9/1981  Chown ............................. 350/96.18

FOREIGN PATENT DOCUMENTS 0469188  11/1974  Australia ......................... 350/96.15
2828989   1/1979  Fed. Rep. of Germany ... 350/96.18
55-41347  3/1980  Japan .

Primary Examiner—John Lee
Attorney, Agent, or Firm—Marc D. Schecter

[57] ABSTRACT

The assignment of light-wave conductors to calculable coupling areas on the end face of graded index rod lenses (GRIN lenses) is difficult and cannot be effected accurately for coupling areas located in different planes. Therefore, the end face is provided with a profile composed, for example, of inlet funnels, which facilitates the positioning. Such profiles can be composed of position-controlled bores.

10 Claims, 3 Drawing Figures

GRADED INDEX ROD LENS COMPRISING LIGHT-WAVE CONDUCTORS

BACKGROUND OF THE INVENTION

The invention relates to a graded index rod lens (GRIN lens) comprising several coupled light-wave conductors for optical data communication systems. Gradient index rod lenses (GRIN lenses) provided with light-wave conductors (LWC's) are used, for example, in multiplex devices for optical broadband transmission.

In an optical multiplexer, GRIN lenses are known, on the end face of which at least two LWC's are coupled (DE-AS 27 45 940). The areas provided for coupling can be calculated with reference to the imaging properties of the GRIN lens. The calculated position of a coupling area can be found only with difficulty, however, laborious measurements being required by fine-mechanical positioning auxiliaries.

SUMMARY OF THE INVENTION

The invention has for its object to make it simpler to find calculable areas for coupling light-wave conductors on the end face of a GRIN lens in order to be able to establish rapidly and reliably couplings which are accurately positioned.

In a GRIN lens of the kind mentioned in the opening paragraph, this is achieved in that an end face of the GRIN lens is provided with a profile in which coupling areas for the light-wave conductors are formed.

The invention is based inter alia on the recognition of the fact that due to the dependence of the imaging properties of GRIN lenses upon the wave length, coupling areas can be located in different planes—with respect to the plane of an end face.

An advantageous embodiment of the invention consists in that the area calculable for each coupling is defined by a funnel-shaped recess. Another advantageous embodiment is obtained in that several concentric GRIN lens disks of different thicknesses are adhered to the end face of the GRIN lens to be connected to the LWC's.

BRIEF DESCRIPTION OF THE DRAWING

The invention will now be described more fully for further advantageous embodiments defined in the claims with reference to the examples shown diagrammatically in the drawing. In the drawing:

DESCRIPTION OF THE PREFERRED EMBODIMENTS

Figure 1:
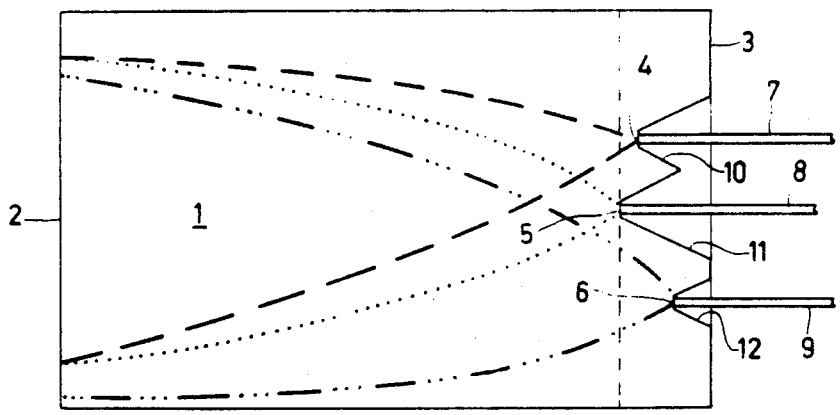
FIG. 1 shows in sectional view a GRIN lens having a funnel-shaped end face structure.

The GRIN lens 1 shown in FIG. 1 forms part of an optical transmission system. Starting from its end face 2, different radiation paths are indicated in broken lines, in dotted lines and in dot-and-dash lines, which may originate from an optical system (not shown) coupled to this end face or which are produced upon reflection at the end face 2 when this face is covered with corresponding reflective layers.

Without taking into account the dimensional accuracy, it is shown that various radiation beams have points of intersection at different distances from the opposite end face 3.

The end face of the GRIN lens 1 has a profile of funnel-shaped recesses 10, 11, 12. The tips of the funnels are located at the points of intersection 4,5,6 of the radiation beams shown to which the LWC's 7,8 and 9 are coupled. For coupling purposes, the LWC's are introduced into the relevant funnel and adhered there to each other. On GRIN lenses of this configuration, LWC's can thus be coupled in a simple and accurate manner to the relevant radiation path.

Such funnels can be formed by photoetching or by precision vibration boring operations so that the funnel tip is located at the relevant point of intersection of the radiation beams. LWC's 7,8 and 9 to be coupled on the end face 3 are by these recesses 10-12 guided to the relevant precalculated coupling areas, at which they are adhered to the GRIN lens 1.

Other forms (not shown) of the recesses are possible and can be defined by the relevant manufacturing method. Thus, regular profile patterns may also be provided on the end faces, in which the relevant recesses are suitable to be used as coupling areas.

Figure 2:
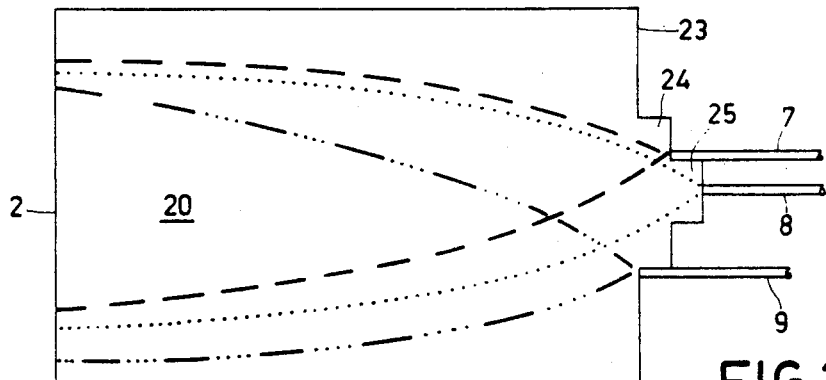
FIG. 2 shows in sectional view another embodiment of a GRIN lens having a terraced end face structure.

FIG. 2 shows a further profile of a GRIN lens 20, in which the same elements are designated by the same reference symbols. The end face 23 of the GRIN lens 20 has a stepped profile, which is obtained when the end face 23 is covered with GRIN lens disks of different diameters.

The plane of the relevant calculated point of intersection is freely accessible for the LWC. In order to facilitate the orientation in finding the coupling area, the diameter of each of the disks 24 and 25 to be placed on the end face 23 is dimensioned in accordance with the distance of the intersection point of the radiation beams from the center. The coupling areas of the LWC's 7 and 9 are located on concentric circles.

Figure 3:
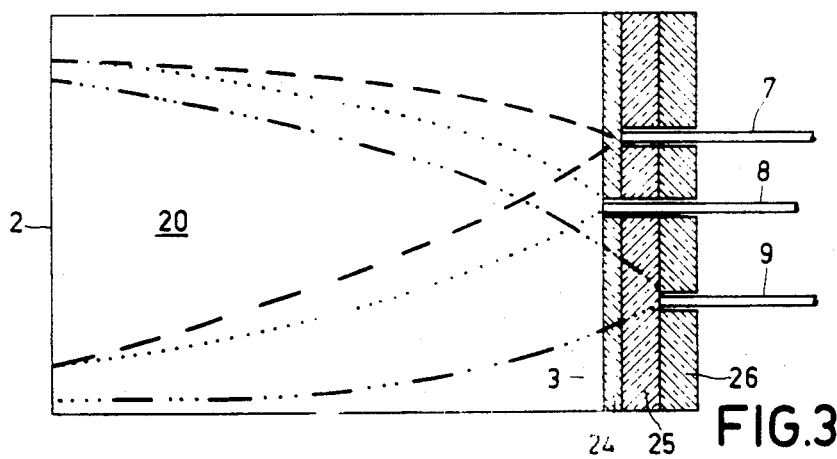
FIG. 3 shows in sectional view another embodiment with disks secured on the end face.

FIG. 3 shows a further version of a profile, To GRIN lenses are now adhered GRIN lens disks 24, 25 and 26, the outer diameter of which corresponds to the diameter of the GRIN lens and which have bores for the relevant coupling area of the LWC's. For calculation of the position of the coupling areas, the material of the disks is also taken into account, which is preferably glass or another radiation-transparent material, for example, synthetic resin. As a matter of course, prismatic disks with obliquely positioned surfaces may also be used, in which bores define the relevant coupling areas.

What is claimed is:

1. A graded-index rod lens (GRIN lens) for several coupled light-wave conductors for optical data communication systems, the improvement therein comprising a profile provided on an end face of the GRIN lens, said profile including coupling areas for light-wave conductors, said coupling areas being in at least two parallel planes, at least two of said planes being at different distances from the end face of said GRIN lens opposite to said end face with said profile.

2. A GRIN lens as claimed in claim 1, wherein the profile is composed of inlet funnels.

3. A graded-index rod lens (GRIN lens) including several coupled light-wave conductors for optical data communication systems, the improvement therein comprising a profile provided on an end face of said GRIN lens, said profile including coupling areas for said light-wave conductors, said profile being composed of GRIN lens disks which are stacked on said end face.

4. A GRIN lens as claimed in claim 3, wherein said stacked GRIN lens disks have different outer diameters.

5. A GRIN lens as claimed in claim 4, wherein said GRIN lens disks are adhered to each other.

6. A GRIN lens as claimed in claim 3, wherein bores are provided in the GRIN lens disks.

7. A GRIN lens as claimed in claim 6, wherein said GRIN lens disks provided with said bores have the same outer diameter.

8. A GRIN lens as claimed in any one of claims 3 to 7, wherein at least one surface of a GRIN lens disk is inclined with respect to said end face of said GRIN lens.

9. A GRIN lens as claimed in claims 2 or 3, wherein recesses are formed by photoetching processes.

10. A GRIN lens as claimed in any one of claims 2 to 6, wherein recesses and bores are formed by means of a vibration boring operation.

* * * * *